US010670030B2

(12) United States Patent
Hiwata et al.

(10) Patent No.: US 10,670,030 B2
(45) Date of Patent: Jun. 2, 2020

(54) TURBO MACHINE AND REFRIGERATING CYCLE APPARATUS

(71) Applicant: Panasonic Intellectual Property Management Co., Ltd., Osaka (JP)

(72) Inventors: Akira Hiwata, Shiga (JP); Kazuyuki Kouda, Osaka (JP); Mamoru Nishibu, Shiga (JP); Tadayoshi Shoyama, Osaka (JP); Takeshi Ogata, Osaka (JP); Hidetoshi Taguchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 488 days.

(21) Appl. No.: 15/139,204

(22) Filed: Apr. 26, 2016

(65) Prior Publication Data

US 2017/0002824 A1 Jan. 5, 2017

(30) Foreign Application Priority Data

Jul. 1, 2015 (JP) .................................. 2015-133115

(51) Int. Cl.
*F04D 29/063* (2006.01)
*F04D 29/06* (2006.01)
(Continued)

(52) U.S. Cl.
CPC .............. *F04D 29/063* (2013.01); *F02C 7/06* (2013.01); *F04D 29/046* (2013.01);
(Continued)

(58) Field of Classification Search
CPC .............. F05D 2240/61; F05D 2240/63; F16C 33/1055; F04D 29/06; F04D 29/061; F04D 29/063; F04D 25/0626; F25B 1/053
(Continued)

(56) References Cited

U.S. PATENT DOCUMENTS 3,163,999 A * 1/1965 Ditzler .................... F25B 1/053
62/469
3,496,992 A * 2/1970 Leonard, Jr. .............. F24F 5/00
165/62
(Continued)

FOREIGN PATENT DOCUMENTS

EP 1785637 A1 * 5/2007 ................ F16C 3/14
EP 3372840 A1 * 9/2018 ........... F04D 29/057
(Continued)

OTHER PUBLICATIONS

The Extended European Search Report dated Nov. 16, 2016 for the related European Patent Application No. 16168783.5.

*Primary Examiner* — Jianying C Atkisson
*Assistant Examiner* — Miguel A Diaz
(74) *Attorney, Agent, or Firm* — McDermott Will & Emery LLP

(57) ABSTRACT

A turbo machine of the present disclosure includes a rotation shaft, a first bearing, a casing, an impeller, a first space, a second space, a storage tank, a first outlet passage, a supply passage, a pump, a main passage, and a sub-passage. The second space is in communication with a space formed between a bearing surface of the first bearing and an outer surface of the rotation shaft. The main passage is in communication with the second space and extends in the rotation shaft from an end of the rotation shaft in an axial direction of the rotation shaft. The sub-passage is formed in the rotation shaft and allows communication between the space between the bearing surface of the first bearing and the outer surface of the rotation shaft and the main passage.

10 Claims, 9 Drawing Sheets

(51) Int. Cl.
*F04D 29/047* (2006.01)
*F04D 29/057* (2006.01)
*F02C 7/06* (2006.01)
*F16C 33/10* (2006.01)
*F04D 29/046* (2006.01)
*F25B 1/053* (2006.01)

(52) U.S. Cl.
CPC ......... *F04D 29/047* (2013.01); *F04D 29/057* (2013.01); *F04D 29/061* (2013.01); *F16C 33/1055* (2013.01); *F25B 1/053* (2013.01); *F05D 2240/61* (2013.01); *F05D 2240/63* (2013.01); *F16C 2360/00* (2013.01)

(58) Field of Classification Search
USPC .......................................................... 62/468
See application file for complete search history.

(56) References Cited

U.S. PATENT DOCUMENTS

| | | | | |
|---|---|---|---|---|
| 3,795,427 | A * | 3/1974 | Licht | F16C 17/024 384/103 |
| 3,964,805 | A * | 6/1976 | Schulien | F16C 17/105 384/399 |
| 4,958,988 | A * | 9/1990 | Regev | F04D 7/06 417/366 |
| 5,195,119 | A * | 3/1993 | Ono | H01J 35/101 378/133 |
| 5,719,454 | A * | 2/1998 | Halsey | H02K 5/1732 310/90 |
| 6,336,797 | B1 * | 1/2002 | Kazakis | F01C 17/063 137/543.15 |
| 6,617,731 | B1 | 9/2003 | Goodnick et al. | |
| 8,302,754 | B2 * | 11/2012 | Yagi | F16D 1/092 192/101 |
| 8,915,666 | B2 * | 12/2014 | Yanagisawa | B63H 23/34 403/1 |
| 8,959,950 | B2 * | 2/2015 | Doty | F04D 29/284 417/366 |
| 9,863,272 | B2 * | 1/2018 | Shoyama | F01D 25/16 |
| 10,066,634 | B2 * | 9/2018 | Ogata | F04D 29/057 |
| 10,107,298 | B2 * | 10/2018 | Shoyama | F04D 29/057 |
| 10,408,232 | B2 * | 9/2019 | Ogata | F16C 27/045 |
| 2006/0216176 | A1 * | 9/2006 | Kaczmarek | F04B 27/04 417/521 |
| 2011/0174009 | A1 | 7/2011 | Iizuka et al. | |
| 2014/0147068 | A1 * | 5/2014 | Dunlap | F16C 33/1055 384/397 |
| 2015/0078689 | A1 * | 3/2015 | Sieveking | F16C 33/1085 384/289 |
| 2015/0300697 | A1 * | 10/2015 | Nishibu | F04D 29/053 415/115 |
| 2016/0003510 | A1 * | 1/2016 | De Larminat | F25B 31/004 62/470 |
| 2016/0177961 | A1 * | 6/2016 | Ogata | F04D 29/056 415/203 |
| 2017/0016452 | A1 * | 1/2017 | Shoyama | F04D 29/053 |
| 2017/0023021 | A1 * | 1/2017 | Ogata | F01D 25/164 |

FOREIGN PATENT DOCUMENTS

| | | |
|---|---|---|
| JP | 2004-011637 A | 1/2004 |
| JP | 2010-031698 | 2/2010 |

* cited by examiner

TURBO MACHINE AND REFRIGERATING CYCLE APPARATUS

BACKGROUND

1. Technical Field

The present invention relates to turbo machines and refrigerating cycling apparatuses.

2. Description of the Related Art

Hitherto, refrigerating machines that include a turbo machine are known. The turbo machine is used as a compressor that compresses a refrigerating gas evaporated by an evaporator so as to be sent to a condenser.

As illustrated in FIG. 8, for example, JAPANESE UNEXAMINED PATENT APPLICATION PUBLICATION NO. 2010-31698 describes a refrigerating machine 300 including a compressor 301, an evaporator 302, a condenser 304, a cooling water tower 316, and a cooling water pump 318. The refrigerating machine 300 uses water as a refrigerant. The compressor 301 includes a rotation shaft 310, an impeller 312, and a bearing 320. In the compressor 301, water as a lubricant is supplied to the bearing 320. Specifically, a portion of cooling water to be supplied to the condenser 304 is sent to the bearing 320 by using the discharge pressure of the cooling water pump 318.

FIG. 9 is a partial magnified view schematically illustrating a structure of a bearing 320 and a section including a sealing portion 330, which separates a space in which the bearing 320 is disposed from a compressing chamber 323, of the compressor 301 illustrated in FIG. 8. The sealing portion 330 in a housing 322 separates the space in which the bearing 320 is disposed from the compressing chamber 323, and is fixed to an inner surface of the housing 322 at a position between the compressing chamber 323 and the bearing 320, which is adjacent to the compressing chamber 323. The sealing portion 330 is a ring-shaped non-contact type seal and is fitted to an outer surface of a rotation shaft 310 with a gap. The compressing chamber 323 is maintained at a negative pressure with respect to the space in which the bearing 320 is disposed, and thus some of the lubricant in the space in which the bearing 320 is disposed is drawn toward the compressing chamber 323 through a space between the sealing portion 330 and the rotation shaft 310. At this time, the sealing portion 330 prevents a large amount of lubricant water from being rapidly sucked into the compressing chamber 323.

SUMMARY

The turbo machine used as the compressor 301 of the refrigerating machine 300 described in JAPANESE UNEXAMINED PATENT APPLICATION PUBLICATION NO. 2010-31698 has room for improvement in reliability. The object of the present disclosure is to provide a highly reliable turbo machine.

The present disclosure provides a turbo machine including:

a rotation shaft;

a first bearing that supports the rotation shaft at least in a radial direction of the rotation shaft;

a casing that forms a suction space into which a working fluid flows;

an impeller that is fixed to the rotation shaft in the casing and that compresses the working fluid flowed into the suction space to discharge the working fluid outside the casing by rotation of the rotation shaft;

a first space that is formed around the rotation shaft at a position between the impeller and the first bearing in an axial direction of the rotation shaft, that is in communication with a space formed between a bearing surface of the first bearing and an outer surface of the rotation shaft, and that stores a lubricating liquid;

a second space that is formed on an opposite side of the first bearing from the impeller in the axial direction of the rotation shaft, that is in communication with the space formed between the bearing surface of the first bearing and the outer surface of the rotation shaft, and that stores the lubricating liquid;

a storage tank that stores the lubricating liquid;

a first output passage that allows communication between an inner space of the storage tank and the first space and through which the lubricating liquid flows from the first space to the storage tank;

a supply passage that allows communication between the inner space of the storage tank and the second space and through which the lubricating liquid flows from the storage tank to the second space;

a pump that is disposed on the supply passage and that pumps the lubricating liquid to the second space;

a main passage that is in communication with the second space, that extends in the rotation shaft in the axial direction of the rotation shaft from one end of the rotation shaft, and through which the lubricating liquid stored in the second space flows in the axial direction of the rotation shaft; and a sub-passage that is formed in the rotation shaft, that allows communication between the space formed between the bearing surface of the first bearing and the outer surface of the rotation shaft and the main passage, and through which the lubricating liquid flows from the main passage to the space formed between the bearing surface of the first bearing and the outer surface of the rotation shaft.

The above-described turbo machine has high reliability.

DETAILED DESCRIPTION

Figure 1:
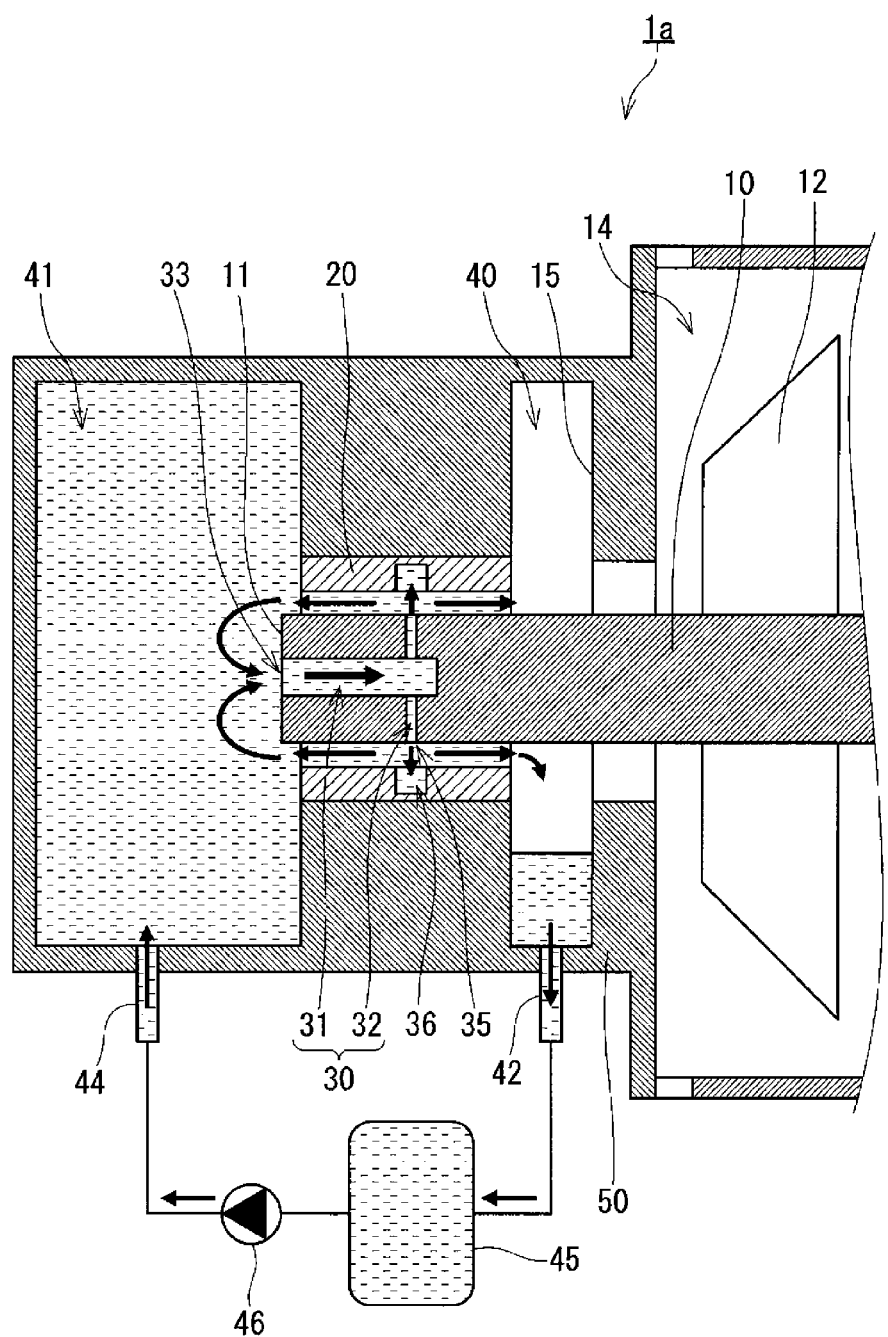
FIG. 1 is a cross-sectional view indicating flow of a lubricating liquid in a turbo machine according to a first embodiment.
Figure 2:
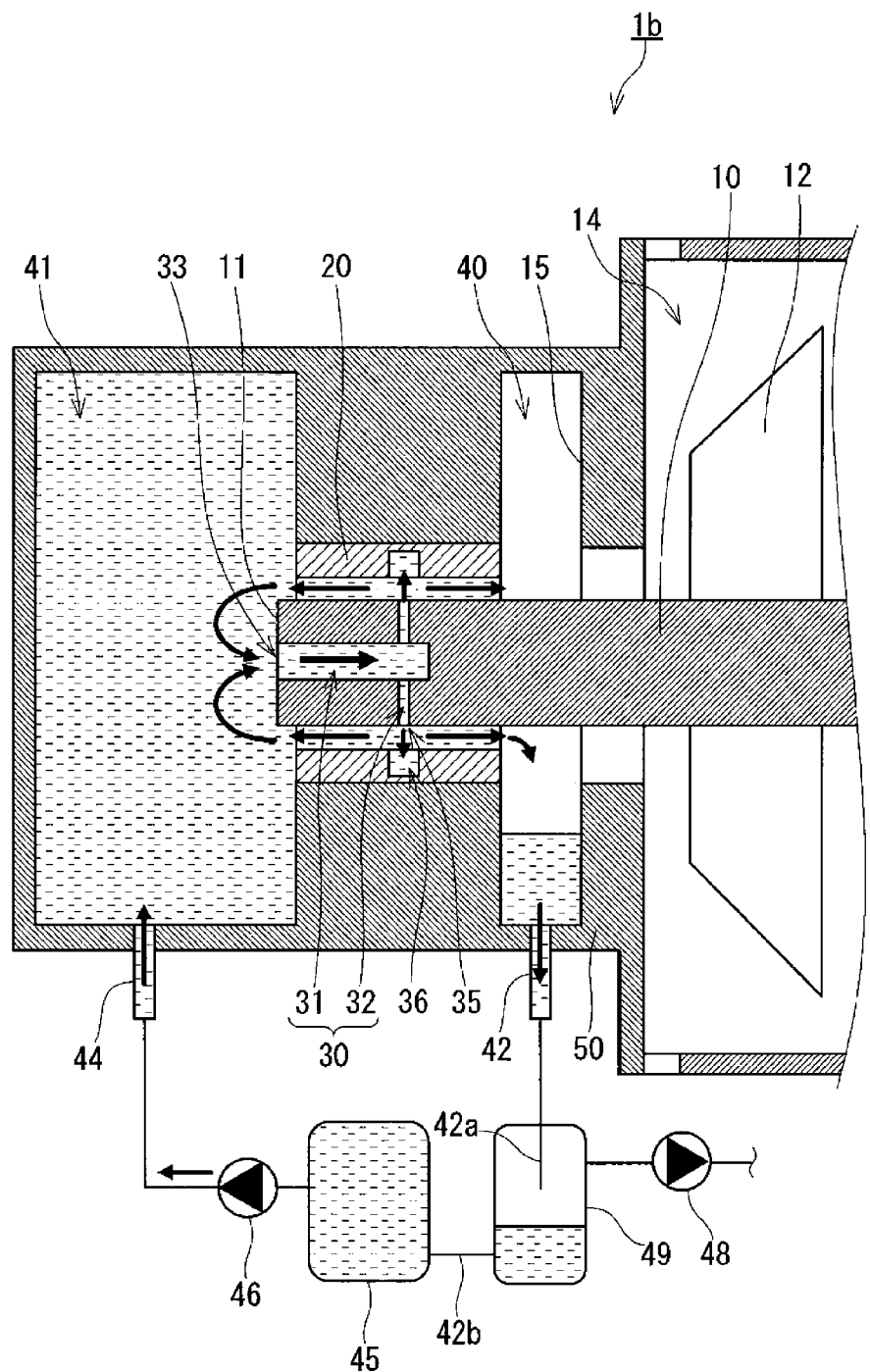
FIG. 2 is a cross-sectional view indicating flow of a lubricating liquid in a turbo machine according to a modification of the first embodiment.

When a lubricating oil is used as a lubricant for a bearing of a compressor of a refrigerating cycle apparatus, a refrigerant may be dissolved or mixed in the lubricating oil, producing a suspension. This may lower a viscosity of the lubricant, leading to deterioration in lubricity. In addition, if the lubricating oil escapes into the refrigerating cycle apparatus, the lubricating oil may behave as a thermal resistance and deteriorate the performance of the refrigerating cycle apparatus. In particular, since the refrigerating machine 300 described in JAPANESE UNEXAMINED PATENT APPLICATION PUBLICATION NO. 2010-31698 uses water as the refrigerant, it is difficult to use the lubricating oil as the lubricant for the bearing of the compressor of the refrigerating cycle apparatus.

The lubricating oil and water may be mixed to produce a suspension, leading to a significant reduction in the lubricity due to deterioration in the viscosity of the lubricant. In addition, if the suspension escapes into the refrigerating cycle apparatus, the lubricating oil may behave as a thermal resistance and deteriorate the performance of the refrigerating cycle apparatus. To solve the problem, in the refrigerating machine 300 described in JAPANESE UNEXAMINED PATENT APPLICATION PUBLICATION NO. 2010-31698, water, which is a refrigerant, is supplied as the lubricant to the bearing 320.

In the refrigerating machine 300 described in JAPANESE UNEXAMINED PATENT APPLICATION PUBLICATION NO. 2010-31698, water as the lubricant is sent to the bearing 320 by using a discharge pressure of a cooling water pump 318, and thus the reliability of the compressor 301 depends on the performance of the cooling pump 318. In a plain bearing used in turbo machines, the amount of heat generation is larger, because the circumferential speed of the rotation shaft of the turbo machine is high. The pressure of the water supplied as the lubricant to the bearing 320 may not be sufficient depending on the performance of the cooling water pump 318. In such a case, the reliability of the compressor 301 may be lowered due to lack of the lubricant. Thus, the cooling water pump 318 needs to have high performance in order to improve the reliability of the compressor 301, resulting in a high production cost of the cooling pump 318.

When a high-performance pump is used as the cooling water pump 318, a large amount of the lubricant is supplied to the bearing 320 so as to cool the bearing 320. However, the large amount of the lubricant may be rapidly sucked into the compressor 323 through the space between the sealing portion 330 and the rotation shaft 310. Thus, the lubricant may collide with the impeller 312, causing damage to the impeller 312.

An improvement in the sealing properties of the sealing portion 330 may prevent the collision of the lubricant with the impeller 312. However, since the sealing portion 330 is a ring-shaped non-contact type seal, it is difficult to reduce the width of the space between the sealing portion 330 and the rotation shaft 310 so as to be smaller than the space between the bearing 320 and the rotation shaft 310, offering limited improvement in the sealing properties of the sealing portion 330.

Instead of the sealing portion 330, a non-contact labyrinth seal, for example, may be used to improve the sealing properties. However, a fluid force in the seal may cause self-oscillation in the rotation shaft 310, increasing the vibration of the compressor 301, which is a turbo machine. In addition, instead of the sealing portion 330, a contact type seal may be used to improve the sealing properties. However, friction between the rotation shaft 310 and the non-contact type seal may cause mechanical loss, deteriorating the performance of the turbo machine.

A first aspect of the present disclosure provides a turbo machine including:

a rotation shaft;

a first bearing that supports the rotation shaft at least in a radial direction of the rotation shaft;

a casing that forms a suction space into which a working fluid flows;

an impeller that is fixed to the rotation shaft in the casing and that compresses the working fluid flowed into the suction space to discharge the working fluid outside the casing by rotation of the rotation shaft;

a first space that is formed around the rotation shaft at a position between the impeller and the first bearing in an axial direction of the rotation shaft, that is in communication with a space formed between a bearing surface of the first bearing and an outer surface of the rotation shaft, and that stores a lubricating liquid;

a second space that is formed on an opposite side of the first bearing from the impeller in the axial direction of the rotation shaft, that is in communication with the space formed between the bearing surface of the first bearing and the outer surface of the rotation shaft, and that stores the lubricating liquid;

a storage tank that stores the lubricating liquid;

a first output passage that allows communication between an inner space of the storage tank and the first space and through which the lubricating liquid flows from the first space to the storage tank;

a supply passage that allows communication between the inner space of the storage tank and the second space and through which the lubricating liquid flows from the storage tank to the second space;

a pump that is disposed on the supply passage and that pumps the lubricating liquid from the storage tank to the second space;

a main passage that is in communication with the second space, that extends in the rotation shaft in the axial direction of the rotation shaft from one end of the rotation shaft, and through which the lubricating liquid stored in the second space flows in the axial direction of the rotation shaft; and a sub-passage that is formed in the rotation shaft, that allows communication between the space formed between the bearing surface of the first bearing and the outer surface of the rotation shaft and the main passage, and through which the lubricating liquid flows from the main passage to the space formed between the bearing surface of the first bearing and the outer surface of the rotation shaft.

According to the first aspect, the lubricating liquid stored in the second space is supplied to the first bearing through the main passage and the sub-passage. At this time, a centrifugal force applied to the lubricating liquid passing through the sub-passage increases as a rotational speed of the rotation shaft increases, and thus the pressure of the lubricating liquid supplied to the first bearing increases as the rotational speed of the rotation shaft increases. Furthermore, since the second space is in communication with the space formed between the bearing surface of the first bearing and the outer surface of the rotation shaft, some of the lubricating liquid supplied to the first bearing returns to the second space, and then flows into the main passage again. In other words, the lubricating liquid circulates between the second space and the first bearing. With this configuration, the first bearing is cooled effectively. Furthermore, the amount of the lubricating liquid flowing into the first space is reduced, and thus damage to the impeller is not caused by a large amount of the lubricating liquid flowing into the suction space. As a result, the turbo machine according to the first aspect has high reliability.

A second aspect of the present invention according to the first aspect provides a turbo machine further including a second outlet passage that allows communication between the inner space of the storage tank and the second space, and through which the lubricating liquid flows from the second space to the storage tank. According to the second aspect, the second outlet passage allows the lubricating liquid to flow from the second space to the storage tank. In this configuration, the amount of the lubricating liquid supplied from the storage tank to the second space through the supply passage is larger than the amount of the lubricating liquid discharged from the first space through the first outlet passage. Some of the lubricating liquid circulating between the second space and the first bearing is continuously replaced with the lubricating liquid stored in the storage tank, and thus the first bearing is cooled effectively. In addition, this configuration eliminates the need for adjusting the amount of the lubricating liquid supplied to the second space by the pump in accordance with the rotational speed of the rotation shaft, and thus the configuration of the pump is simplified while the first bearing is cooled reliably and effectively.

A third aspect of the present disclosure according to the second aspect provides the turbo machine further including: a second bearing that is disposed on an opposite side of the first space from the impeller in the axial direction of the rotation shaft at a position closer than the first space to an end of the rotation shaft and that supports the rotation shaft in at least the axial direction of the rotation shaft; and a pressure reducing device that is disposed on the second outlet passage, and that reduces a pressure of the lubricating liquid, wherein the working fluid is a fluid having a negative saturated pressure at ambient temperature, and the first space is in communication with the suction space. According to the third aspect, since the first space is in communication with the suction space, the pressure in the first space is substantially equal to the pressure in the suction space. In contrast, since the pressure reducing device is disposed on the second outlet passage, the lubricating liquid is supplied to the second space at a pressure higher than the pressure in the suction space. Thus, cavities are not generated in the lubricating liquid in the main passage and the sub-passage. As a result, the lubricating liquid in the main passage and the sub-passage does not contain gas, leading to an increase in the pressure of the lubricating liquid supplied to the first bearing. In addition, the working fluid is a fluid having a negative saturated vapor pressure at ambient temperature, a load in the axial direction of the rotation shaft (thrust load) applied to the second bearing is made significantly small even if a compression ratio of the turbo machine is high.

A fourth aspect of the present disclosure according to the third aspect provides the turbo machine, wherein the rotation shaft includes a tapered surface that has an outer diameter gradually decreasing toward the end of the rotation shaft, and the second bearing forms a tapered hole having an inner diameter that gradually decreases toward the end of the rotation shaft, and that is a tapered bearing having a bearing surface facing the tapered surface. According to the fourth aspect, a loss caused when the lubricant stored in the second space is stirred due to the rotation of the rotation shaft, while the end of the rotation shaft is in the second space, is reduced.

A fifth aspect of the present disclosure according to any one of the first to fourth aspects provides the turbo machine, wherein the first bearing has a ring-shaped groove formed in the bearing surface of the first bearing at a position around an outlet of the sub-passage in the outer surface of the rotation shaft. According to the fifth aspect, in the space between the outer surface of the rotation shaft and the bearing surface of the first bearing, a larger area is affected by the pressure of the lubricating liquid that has been increased in the sub-passage by the rotation of the rotation shaft. This reliably increases the pressure of the lubricating liquid supplied to the space between the outer surface of the rotation shaft and the bearing surface of the first bearing.

A sixth aspect of the present disclosure according to any one of the first to fifth aspects provides the turbo machine further including a gas-liquid separator that is disposed on the first outlet passage and that separates gas contained in the lubricating liquid from the lubricating liquid. According to the sixth aspect, since the gas-liquid separator separates the gas contained in the lubricating liquid from the lubricating liquid, the gas contained in the lubricating liquid does not block the first outlet passage, and discharge of the lubricating liquid stored in the first space is not disrupted. As a result, the lubricating liquid in the first space does not flow into the suction space and does not cause damage to the impeller.

A seventh aspect of the present disclosure provides a refrigerating cycle apparatus including:

the turbo machine according to any one of the first to sixth aspects;

a condenser that condenses a working fluid compressed by the turbo machine and that stores the working fluid as a refrigerant liquid; and a communication passage that allows communication between an inner space of the condenser and the inner space of the storage tank, and through which the refrigerant liquid flows from the condenser to the storage tank, wherein the storage tank stores the refrigerant liquid as the lubricating liquid and serves as an evaporator that evaporates the refrigerant liquid so as to be supplied to the suction space.

According to the seventh aspect, the storage tank of the turbo machine is used as the evaporator of the refrigerating cycle apparatus. In addition, the refrigerant of the refrigerating cycle apparatus is used as the lubricating liquid for the first bearing.

Hereinafter, embodiments of the present disclosure are described with reference to the drawings. The following descriptions are related to an example of the present invention, and the invention is not limited by the descriptions.

Turbo Machine

First Embodiment

As illustrated in FIG. 1, a turbo machine 1a includes a rotation shaft 10, a first bearing 20, a casing 50, an impeller 12, a first space 40, a second space 41, a storage tank 45, a first outlet passage 42, a supply passage 44, a pump 46, a main passage 31, and a sub-passage 32. The turbo machine 1a is a centrifugal, axial flow, or oblique flow fluid machine, for example. The rotation shaft 10 extends horizontally, for example. The first bearing 20 supports the rotation shaft 10 at least in a radial direction of the rotation shaft 10. The first bearing 20 surrounds the rotation shaft 10 such that a lubricating liquid is present between the first bearing 20 and an outer surface of the rotation shaft 10. The first bearing 20 is a plain bearing that supports at least a radial load of the rotation shaft 10. The casing 50 provides a suction space 14 into which a working fluid of the turbo machine 1a flows. An inner surface of the casing 50 defines the suction space 14. The impeller 12 is fixed to the rotation shaft 10 in the casing 50. The impeller 12 compresses the working fluid that has flowed into the suction space 14 by the rotation of the rotation shaft 10 and allows the compressed working fluid to flow toward the outside of the casing 50. The casing 50 houses the first bearing 20 at a position closer than the impeller 12 to an end 11 of the rotation shaft 10.

The first space 40 and the second space 41 are spaces inside the casing 50. The first space 40 is formed around the rotation shaft 10 at a position between the impeller 12 and the first bearing 20 in an axial direction of the rotation shaft 10 and is in communication with a space between a bearing surface of the first bearing 20 and an outer surface of the rotation shaft 10. The first space 40 stores the lubricating liquid. A partition wall 15 is disposed in the casing 50, and the first space 40 is defined by an inner surface of the casing 50 including the partition wall 15 and an end surface of the first bearing 20, for example. The rotation shaft 10 extends through the first space 40. A ring-shaped space is formed between the partition wall 15 and the rotation shaft 10, and the width of the space is larger than the width of the space between the bearing surface of the first bearing 20 and the outer surface of the rotation shaft 10. The ring-shaped space between the partition wall 15 and the rotation shaft 10 may have a different shape as long as the space does not allow contact between the rotation shaft 10 and the partition wall 15. The second space 41 is formed on an opposite side of the impeller 12 from the first bearing 20 in the axial direction of the rotation shaft 10 and is in communication with the space between the bearing surface of the first bearing 20 and the outer surface of the rotation shaft 10. The second space 41 stores the lubricating liquid. The storage tank 45 stores the lubricating liquid. The first outlet passage 42 allows the inner space of the storage tank 45 and the first space 40 to be in communication with each other such that the lubricating liquid flows from the first space 40 to the storage tank 45. The supply passage 44 allows the inner space of the storage tank 45 and the second space 41 to be in communication with each other such that the lubricating liquid flows from the storage tank 45 to the second space 41. The pump 46 is disposed on the supply passage 44. The pump 46 pumps the lubricating liquid toward the second space 41. With this configuration, the lubricating liquid stored in the storage tank 45 is supplied sufficiently to the second space 41 through the supply passage 44, and the supplied lubricating liquid is stored in the second space 41.

A lubricating liquid supply passage 30 including a main passage 31 and a sub-passage 32 is provided in the rotation shaft 10. The main passage 31, which is in communication with the second space 41, extends in the rotation shaft 10 from the end 11 of the rotation shaft 10 in the axial direction of the rotation shaft 10 so as to allow the lubricating liquid stored in the second space 41 to flow in the axial direction of the rotation shaft 10. The main passage 31 extends from an inlet 33 at the end 11 of the rotation shaft 10 in the axial direction of the rotation shaft 10. The end 11 of the rotation shaft 10 is soaked in the lubricating liquid stored in the second space 41, for example. The sub-passage 32 is provided in the rotation shaft 10 so as to allow communication between the space formed between the bearing surface of the first bearing 20 and the outer surface of the rotation shaft 10 and the main passage 31. The auxiliary passage 32 allows the lubricating liquid to flow from the main passage 31 to the space between the bearing surface of the first bearing 20 and the outer surface of the rotation shaft 10. The sub-passage 32 branches from the main passage 31 and extends to an outlet 35 in the outer surface of the rotation shaft 10. The outlet 35 of the sub-passage 32 faces the bearing surface of the first bearing 20. The lubricating liquid supply passage 30 includes four sub-passages 32 arranged in a circumferential direction of the rotation shaft 10, for example. The lubricating liquid supply passage 30 may include one sub-passage or two or three or five or more sub-passages 32 arranged in the circumferential direction of the rotation shaft 10.

The rotation shaft 10 is connected to a motor (not illustrated). The rotation shaft 10 and the impeller 12 rotate when the motor is activated. Thus, the working fluid flows into the suction space 14, and the compressed working fluid is discharged outside the turbo machine 1a.

While the turbo machine 1a is in operation, the rotation shaft 10 rotates. The width of the space between the outer surface of the rotation shaft 10 and the bearing surface of the first bearing 20 is set so as to allow hydrodynamic lubrication with the lubricating liquid while the turbo machine 1a is in operation. In this case, the rotation shaft 10 and the first bearing 20 are not in solid contact, and a shear resistance of the lubricating liquid in the space between the outer surface of the rotation shaft 10 and the bearing surface of the first bearing 20 causes a mechanical loss. Here, if the first bearing 20 is not cooled sufficiently, the space between the outer surface of the rotation shaft 10 and the bearing surface of the first bearing 20 is made small by thermal expansion caused by the heat generated due to the mechanical loss. In addition, when the temperature of the lubricating liquid is increased by the heat generated due to the mechanical loss, the viscosity of the lubricating liquid decreases. This increases an eccentricity ratio although the load in the radial direction of the rotation shaft 10 to be supported remains the same. Thus, the minimum value of the width of the space between the outer surface of the rotation shaft 10 and the bearing surface of the first bearing 20 is made small. As a result, if the first bearing 20 is not cooled sufficiently, solid surfaces partly come in contact in the space between the rotation shaft 10 and the first bearing 20, leading to abnormal wear such as galling at the bearing surface of the first bearing 20.

As illustrated in FIG. 1, in the turbo machine 1a, the lubricating liquid in the lubricating liquid supply passage 30, particularly in the sub-passage 32, is pressurized by the centrifugal force generated by rotation of the rotation shaft 10. The pressurized lubricating liquid is supplied to the space between the rotation shaft 10 and the first bearing 20. Arrows in FIG. 1 conceptually indicate how the lubricating liquid flows while the rotation shaft 10 rotates. In addition, arrows in FIG. 2 to FIG. 5 also conceptually indicate how the lubricating liquid flows. The lubricating liquid that has flowed into the main passage 31 through the inlet 33 flows through the main passage 31 in the axial direction of the rotation shaft 10. Then, the lubricating liquid is guided to the sub-passage 32 and flows to the outside through the outlet 35 after passing through the sub-passage 32. As described above, the lubricating liquid supply passage 30 functions as a pump mechanism using the rotation of the rotation shaft 10, and the lubricating liquid having a predetermined pressure is supplied to the space between the rotation shaft 10 and the first bearing 20. Since the centrifugal force applied to the lubricating liquid passing through the sub-passage 32 increases as the rotational speed of the rotation shaft 10 increases, the pressure of the lubricating liquid to be supplied to the space between the rotation shaft 10 and the first bearing 20 is increased by increasing the rotational speed of the rotation shaft 10.

As illustrated in FIG. 1, the first bearing 20 has a ring-shaped groove 36, for example. The groove 36 is formed in the bearing surface of the first bearing 20 at a position around the inlet 35 of the sub-passage 32 in the outer surface of the rotation shaft 10. The width of the groove 36 in the axial direction of the rotation shaft 10 is larger than the width of the outlet 35 in the axial direction of the rotation shaft 10, for example. The formation of the groove 36 expands the area affected by the pressure of the lubricating liquid, which has been increased in the sub-passage 32 by the rotation of the rotation shaft, from an area around the outlet 35 to the entire inside of the groove 36. This reliably increases the pressure of the lubricating liquid supplied to the space between the rotation shaft 10 and the first bearing 20. The groove 36 in the first bearing 20 is optional in some cases.

The lubricating liquid supplied to the space between the rotation shaft 10 and the first bearing 20 constitutes a flow of the lubricating liquid flowing toward the first space 40 and a flow of the lubricating liquid flowing toward the second space 41. The lubricating liquid flowing toward the second space 41 cools the first bearing 20 while passing through the space between the rotation shaft 10 and the first bearing 20, and then flows into the second space 41. Some of the lubricating liquid that has flowed into the second space 41 flows back to the lubricating liquid supply passage 30. The lubricating liquid circulating between the first bearing 20 and the second space 41 in this manner effectively cools the first bearing 20. In addition, the lubricating liquid flowing in the lubricating liquid supply passage 30 formed in the rotation shaft 10 effectively cools the rotation shaft 10.

The lubricating liquid flowing toward the first space 40 cools the first bearing 20 while passing through the space between the rotation shaft 10 and the first bearing 20, and then flows into the first space 40. The first space 40 is in communication with the inner space of the storage tank 45 through the first outlet passage 42. Thus, the lubricating liquid that has flowed into the first space 40 is guided into the storage tank 45 through the first outlet passage 42, and is then supplied to the second space 41 again through the supply passage 44 by using the pump 46.

As described above, since the lubricating liquid circulates between the first bearing 20 and the second space 41, the cooling effect of the first bearing 20 is improved without increasing the amount of the lubricating liquid that has flowed into the first space 40. With this configuration, the amount of the lubricating liquid that has flowed into the first space 40 is reduced. Thus, a large amount of the lubricating liquid does not flow into the suction space 14 without disposing a sealing component around the outer surface of the rotation shaft 10 at a position between the first space 40 and the suction space 14 in the axial direction of the rotation shaft 10. As a result, the turbo machine 1a has high reliability, because damage to the impeller by the lubricating liquid that has flowed into the suction space 14 is prevented and the cooling effect of the first bearing 20 is improved. In addition, since the amount of the lubricating liquid discharged from the turbo machine 1a together with the working fluid is reduced, the performance of the refrigerating cycle apparatus is not lowered when the refrigerating cycle apparatus includes the turbo machine 1a, for example, and thus a high-performance refrigerating cycle apparatus is provided.

The pump 46 preferably operates constantly while the rotation shaft 10 rotates. However, the pump 46 may stop for some reason. A power failure, for example, may stop the power supply to the motor connected to the pump 46 and the rotation shaft 10. In such a case, if the second space 41 stores a sufficient amount of the lubricating liquid, the lubricating liquid can be supplied to the first bearing 20 as long as the rotation shaft 10 rotates. Thus, the second space 41 preferably has a capacity for storing a sufficient amount of the lubricating liquid to safety stop the turbo machine 1a.

The temperature of the lubricating liquid supplied to the first bearing 20 increases when the lubricating liquid cools the first bearing 20. The lubricating liquid discharged from the first space 40 is naturally cooled while passing through the first passage 42 and while being in the storage tank 45, for example. In addition, the turbo machine 1a may include a cooler that cools the inner space of the storage tank 45 in order to reliably cool the lubricating liquid in the storage tank 45. A cooler of any type that is configured to cool the inner space of the storage tank 45 may be used, and the cooler may be a pipe providing a passage for a heat exchange medium for cooling or a peltier device, for example. If the cooler is disposed in the storage tank 45, the outer surface of the storage tank 45 is preferably covered with an insulating material or the storage tank 45 preferably has an insulating structure so as to prevent the lubricating liquid from absorbing the heat around the storage tank 45.

The turbo machine 1a may be modified from various perspectives. The turbo machine 1a may be modified as a turbo machine 1b illustrated in FIG. 2, for example. The turbo machine 1b has the same configuration as the turbo machine 1a unless otherwise specified. The turbo machine 1b further includes a gas-liquid separator 49 that is disposed on the first outlet passage 42 and that is configured to separate the gas contained in the lubricating liquid from the lubricating liquid. The gas-liquid separator 49 includes a container having an inner space with a predetermined capacity. A portion of the first outlet passage 42 is constituted by a pipe 42a that opens in the inner space of the gas-liquid separator 49. Another portion of the first outlet passage 42 is constituted by a communication pipe 42b that allows communication between the inner space of the gas-liquid separator 49 and the inner space of the storage tank 45. The gas-liquid separator 49 is connected to a pump 48.

The lubricating liquid discharged from the first space 40 flows into the inner space of the gas-liquid separator 49 through the pipe 42a. In the inner space of the gas-liquid separator 49, the gas contained in the lubricating liquid accumulates on an upper side of the inner space of the gas-liquid separator 49 and the lubricating liquid accumulates on a lower side of the inner space of the gas-liquid separator 49. The gas-liquid separator 49 separates the gas contained in the lubricating liquid from the lubricating liquid in this way. The lubricating liquid accumulated on the lower side of the inner space of the gas-liquid separator 49 flows into the inner space of the storage tank 45 through the communication pipe 42b, and the gas accumulated on the upper side of the inner space of the gas-liquid separator 49 is discharged from the inner space of the gas-liquid separator 49 when the pump 48 is activated. With this configuration, even if gas is contained in the lubricating liquid discharged from the first space 40, the gas does not block the first outlet passage 42, and thus the discharge of the lubricating liquid stored in the first space 41 is not disrupted. As a result, a large amount of the lubricating liquid does not flow from the first space 41 into the suction space 14 and does not damage the impeller 12.

Second Embodiment

Next, a turbo machine 1c according to a second embodiment is described. The turbo machine 1c has the same configuration as the turbo machine 1a unless otherwise specified. Components of the turbo machine 1c identical to or corresponding to the components of the turbo machine 1a are assigned the same reference numerals as those of the turbo machine 1a and are not described in detail. The explanation regarding the first embodiment is applicable to the second embodiment if no technical contradiction occurs.

Figure 3:
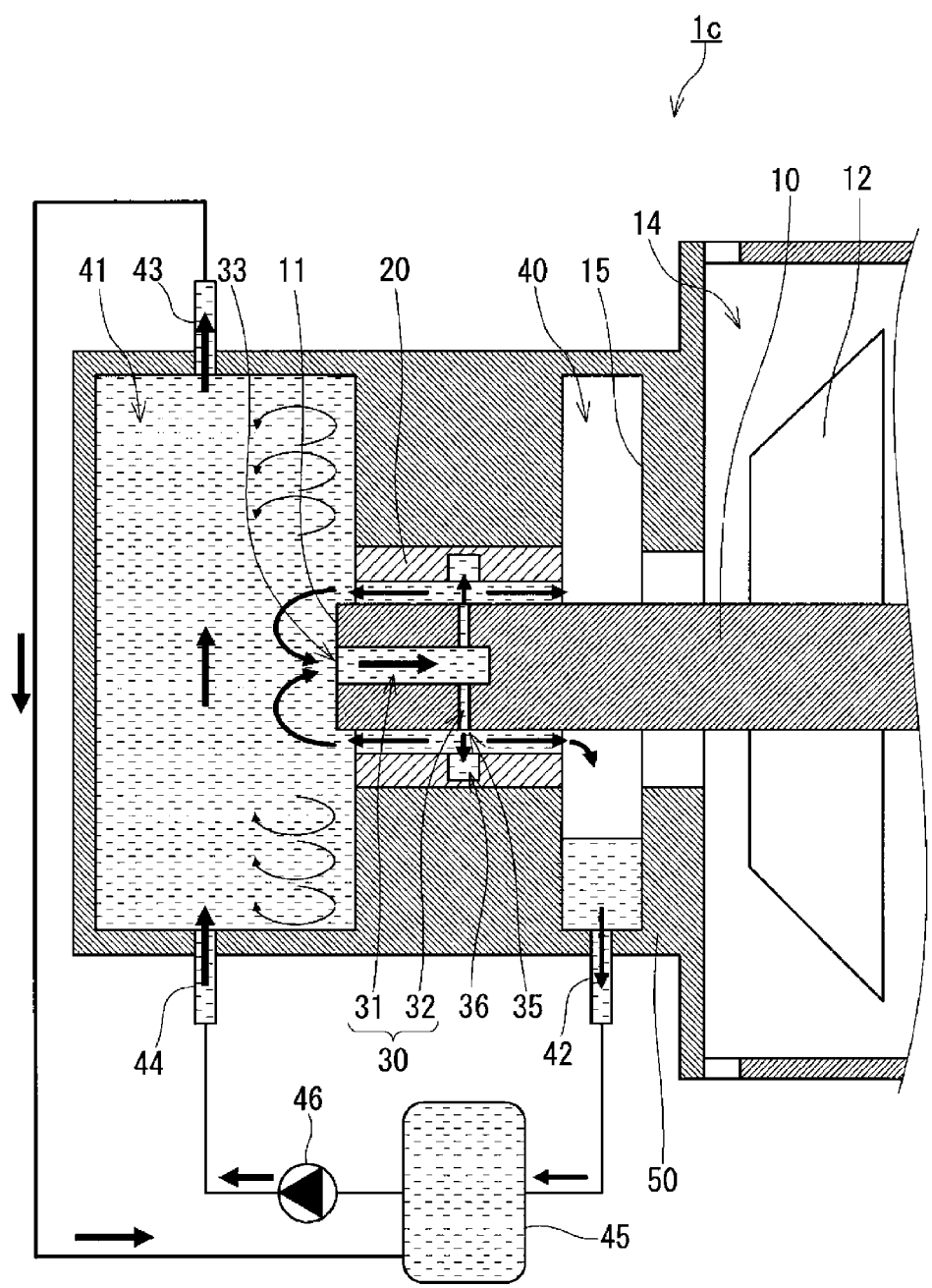
FIG. 3 is a cross-sectional view indicating flow of a lubricating liquid in a turbo machine according to a second embodiment.

As illustrated in FIG. 3, the turbo machine 1c further includes a second outlet passage 43 that allows communication between the inner space of the storage tank 45 and the second space 41 so as to allow the lubricating liquid to flow from the second space 41 to the storage tank 45. With this configuration, the amount of the lubricating liquid supplied from the storage tank 45 to the second space 41 through the supply passage 44 is larger than the amount of the lubricating liquid discharged from the first space 40 through the first outlet passage 42. With this configuration, some of the lubricating liquid circulating between the second space 41 and the first bearing 20 is continuously replaced with the lubricating liquid stored in the storage tank 45, and thus the first bearing 20 is cooled effectively. In addition, this configuration accelerates convection of the lubricating liquid in the second space 41, and thus the components around the first bearing 20 in the second space 41 are cooled effectively. This also provides high reliability to the turbo machine 1c.

When the rotation shaft 10 rotates at a high speed, the centrifugal force applied to the lubricating liquid in the sub-passage 32 increases as the rotation shaft 10 rotates. In such a case, in the case of the turbo machine 1a, the pump 46 needs to supply the lubricating liquid to the second space 41 such that a sufficient amount of the lubricating liquid is present in the second space 41. In other words, the amount of the lubricating liquid supplied to the second space 41 needs to be properly controlled by the pump 46 in accordance with the rotational speed of the rotation shaft 10 of the turbo machine 1a. However, the turbo machine 1c further includes the second outlet passage 43. Thus, the amount of the lubricating liquid supplied to the second space does not need to be finely adjusted in accordance with changes in the rotational speed of the rotation shaft during the period from the activation of the turbo machine 1c to the high-speed rotation. The amount of the lubricating liquid supplied by using the pump 46 is set at a constant value in accordance with the amount of the lubricating liquid supplied to the second space 41 during the high-speed rotation of the turbo machine 1c, for example. This simplifies apparatuses such as a mechanism that detects the rotational speed of the rotation shaft 10 of the turbo machine 1c for feed-back control of the pump 46 and an inverter that changes the amount of the lubricating liquid supplied by using the pump 46. As a result, the performance required for the pump 46 is limited, and thus the production cost of the turbo machine 1c is reduced.

Third Embodiment

Next, a turbo machine 1d according to a third embodiment is described. The turbo machine 1d has the same configuration as the turbo machine 1a unless otherwise specified. Components of the turbo machine 1d identical to or corresponding to the components of the turbo machine 1a are assigned the same reference numerals as those of the turbo machine 1a and are not described in detail. The explanation regarding the first embodiment is applicable to the third embodiment if no technical contradiction occurs.

Figure 4:
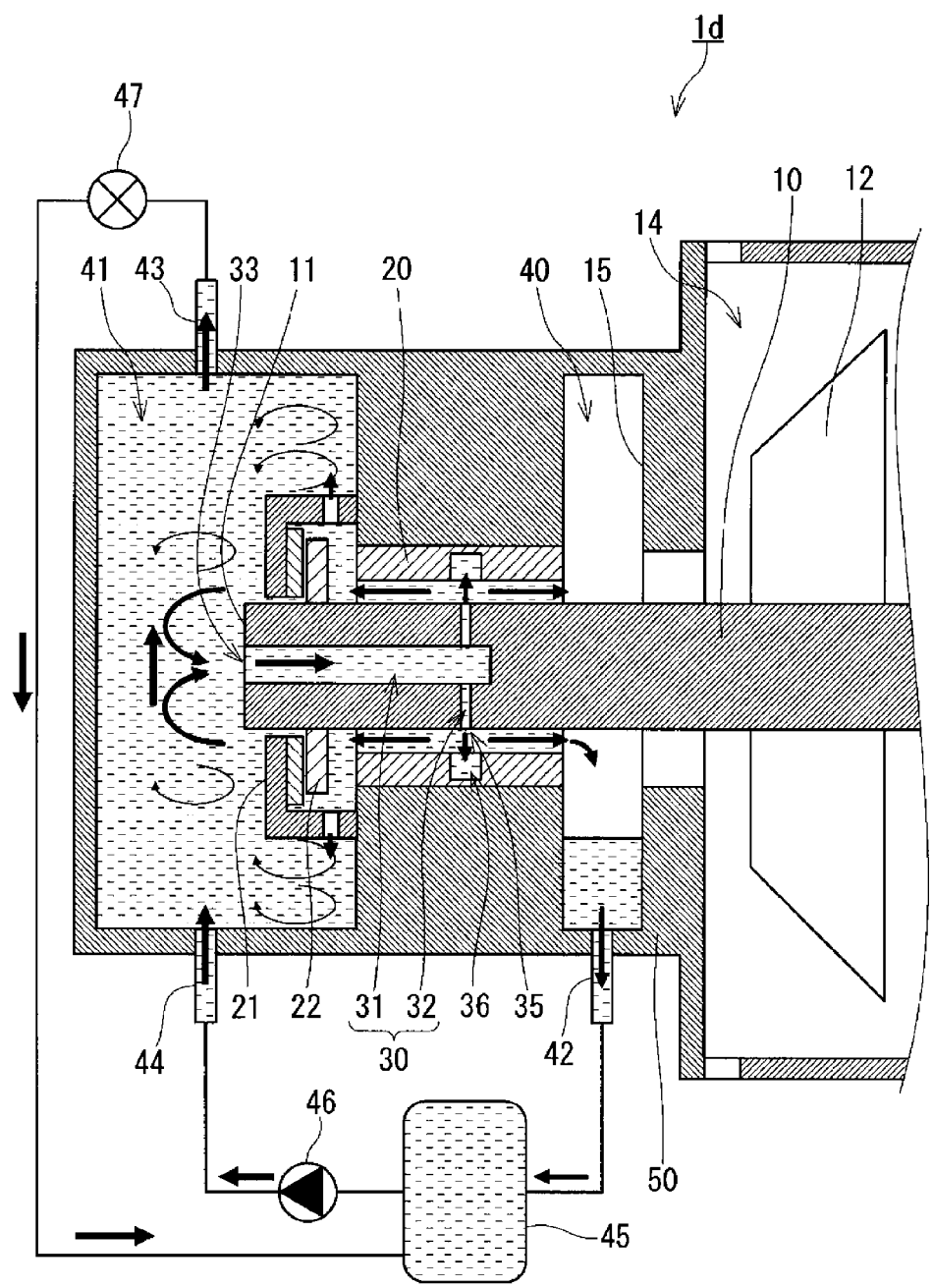
FIG. 4 is a cross-sectional view indicating flow of a lubricating liquid in a turbo machine according to a third embodiment.
Figure 5:
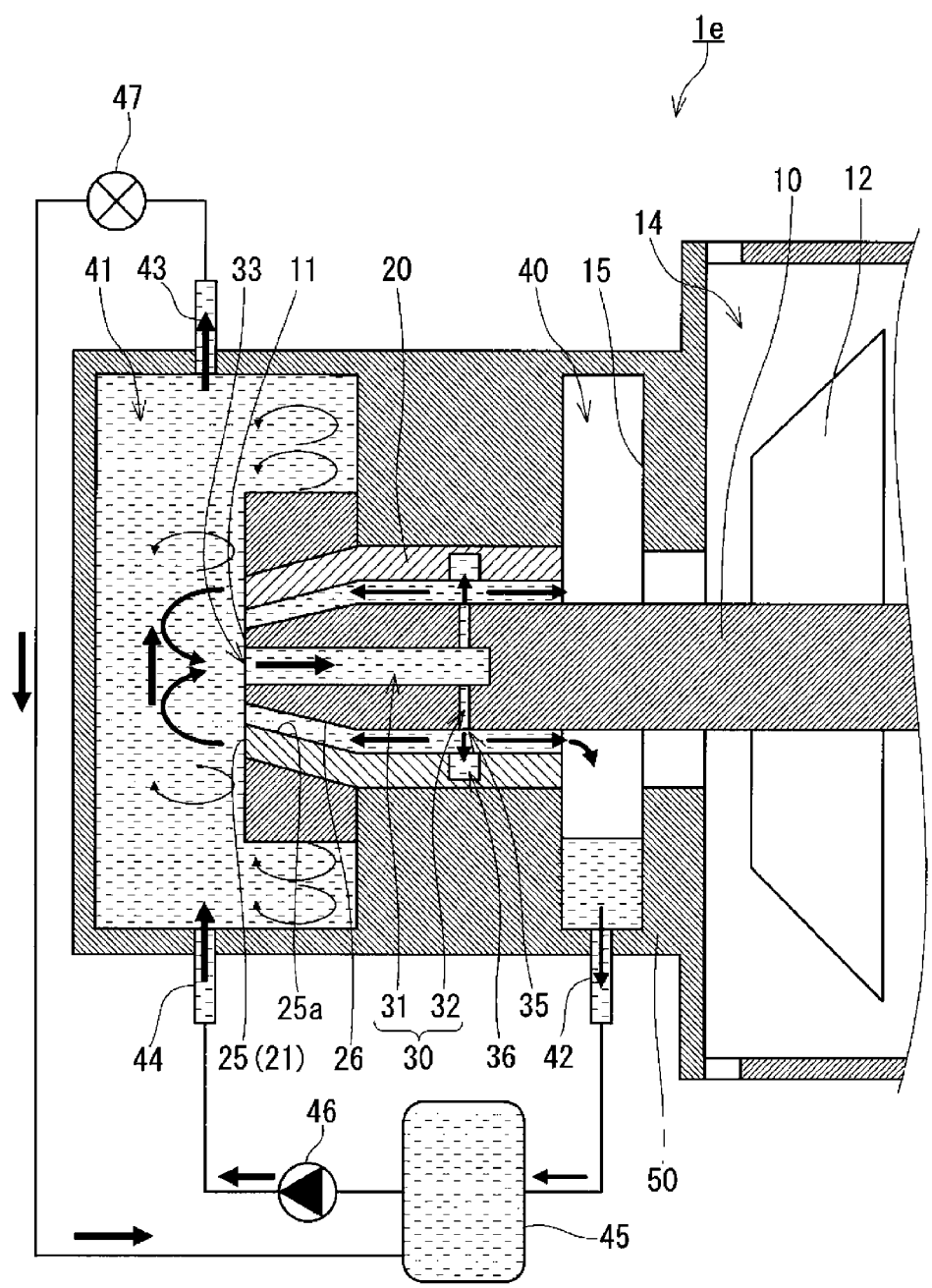
FIG. 5 is a cross-sectional view indicating flow of a lubricating liquid in a turbo machine according to a modification of the third embodiment.

As illustrated in FIG. 4, the turbo machine 1d further includes a second outlet passage 43 that allows communication between the inner space of the storage tank 45 and the second space 41 so as to allow the lubricating liquid to flow from the second space 41 to the storage tank 45. The turbo machine 1d further includes a second bearing 21 and a pressure reducing device 47. The second bearing 21 is positioned on an opposite side of the first space 40 from the impeller 12 in the axial direction of the rotation shaft 10 at a position closer than the first space 40 to the end 11 of the rotation shaft 10. The second bearing 21 supports the rotation shaft 10 at least in the axial direction of the rotation shaft 10. The pressure reducing device 47 is disposed on the second outlet passage 43 and reduces the pressure of the lubricating liquid. The pressure reducing device 47 is an expansion valve or a capillary tube, for example. The pressure reducing device 47 controls the pressure of the lubricating liquid supplied to the first bearing 20. In addition, the working fluid is a fluid that has a negative saturated vapor pressure at ambient temperature (Japanese Industrial Standards: 20° C.±15° C./JIS Z 8703). In addition, as described in the first embodiment, the first space 40 is in communication with the suction space 14.

The working fluid may be any fluid that has a negative saturated vapor pressure at ambient temperature, and the working fluid may be a fluid including water, alcohol, or ether as a main component. The turbo machine 1d operates at a pressure close to the saturated vapor pressure of the working fluid, for example. The pressure of the working fluid in the suction space 14 of the turbo machine 1d is 0.5 to 5 kPaA, for example. The pressure of the working fluid discharged from the turbo machine 1d is 5 to 15 kPaA, for example.

Since the first space 40 is in communication with the suction space 14, the pressure in the first space 40 is substantially equal to the pressure in the suction space 14. By contrast, since the pressure reducing device 47 is disposed on the second outlet passage 43, the lubricating liquid is supplied to the second space 41 at the pressure higher than the pressure in the suction space 14. This prevents cavitation in the lubricating liquid in the main passage 31 and the sub-passage 32. As a result, the lubricating liquid in the main passage 31 and the sub-passage 32 does not contain gas, leading to an increase in the pressure of the lubricating liquid supplied to the first bearing 20.

In the turbo machine 1d, some of the working fluid is used as the lubricating liquid supplied to the first bearing 20. In such a case, cavitation number in the flow of the lubricating liquid remains relatively small even if the flow speed of the lubricating liquid is made slower, because the difference between the pressure of the lubricating liquid and the saturated vapor pressure of the lubricating liquid is small. Here, the cavitation number is calculated by dividing a difference between the pressure of the lubricating liquid and the saturated vapor pressure of the lubricant liquid by a dynamic pressure calculated from the flow speed of the lubricating liquid and the density of the lubricating liquid. The end 11 of the rotation shaft 10 needs to be soaked in the lubricating liquid stored in the second space 41 so as to allow the lubricating liquid to flow into the main passage 31, and the rotation shaft 10 stirs and moves the lubricating liquid when rotated. Thus, it is difficult to decrease the flow speed of the lubricating liquid. This may not be advantageous from the perspective of reducing the cavitation. In addition, a circumferential speed of the rotation shaft 10 of the turbo machine 1d is high, and a large amount of heat is generated by friction. In addition, as the circumferential speed of the rotation shaft 10 increases, the pressure of the lubricating liquid tends to become negative at a position where the width of the space between the outer surface of the rotation shaft 10 and the bearing surface of the first bearing 20 is relatively large in the circumferential direction of the rotation shaft 10. This may not be advantageous from the perspective of reducing the evaporation of the lubricating liquid and the cavitation in the lubricating liquid. When the lubricating liquid contains gas due to the cavitation or evaporation, a centrifugal force generated by the rotation of the rotation shaft 10 is hardly applied to the gas, which has a low density. Thus, the pressure of the lubricating liquid supplied to the first bearing 20 is less likely to be increased, and a sufficient amount of the lubricating liquid is less likely to be supplied to the first bearing 20. However, in the turbo machine 1d, as described above, the lubricating liquid is supplied to the second space 41 at the pressure higher than the pressure in the suction space 14. Thus, the cavitation in the lubricating liquid in the lubricating liquid supply passage 30 or near the lubricating liquid supply passage 30 is prevented even if some of the working fluid is supplied as the lubricating liquid to the first bearing 20. This prevents the lubricating liquid flowing in the lubricating liquid passage 30 from containing gas, leading to an increase in the pressure of the lubricating liquid supplied to the first bearing 20. This prevents the evaporation of the lubricating liquid or the cavitation at the position where the width of the space between the outer surface of the rotation shaft 10 and the bearing surface of the first bearing 20 is relatively large in the circumferential direction of the rotation shaft. As a result, the first bearing 20 is cooled effectively, and thus the turbo machine 1d has high reliability.

As illustrated in FIG. 4, a supported member 22 is attached to the rotation shaft 10, for example. The supported member 22, which has a ring shape, extends from the outer surface of the rotation shaft 10 in the radial direction of the rotation shaft 10 and faces the second bearing 21. The second bearing 21 is fixed to the casing 50 and surrounds the supported member 22 while the lubricating liquid is present between the second bearing 21 and the supported member 22. The bearing surface of the second bearing 21 has a stepped, pocket-shaped, or spiral-shaped groove, for example. With this configuration, a dynamic pressure is generated in the lubricating liquid present between the second bearing 21 and the supported member 22 when the rotation shaft 10 rotates, and thus the thrust load of the rotation shaft 10 is supported. Since the working fluid is a fluid that has a negative saturated vapor pressure at ambient temperature, the thrust load of the rotation shaft 10 is significantly small even if the turbo machine 1d has a high compression ratio. This enables the dimension of the second bearing 21 to be small. In addition, as illustrated in FIG. 4, the outer surface of the second bearing 21 may be in the second space 41, for example. With this configuration, the lubricating liquid stored in the second space 41 effectively cools the second bearing 21, and thus the turbo machine 1d has high reliability.

The turbo machine 1d may be modified from various perspectives. The turbo machine 1d may be modified to a turbo machine 1e illustrated in FIG. 5, for example. The turbo machine 1e has the same configuration as the turbo machine 1d unless otherwise specified. In the turbo machine 1e, the rotation shaft 10 includes a tapered surface 26 that has an outer diameter gradually decreasing toward the end 11 of the rotation shaft 10. In addition, the second bearing 21 is a tapered bearing 25. The tapered bearing 25 has a tapered surface 25a that provides a tapered hole having an inner diameter gradually decreasing toward the end 11 of the rotation shaft 10 and that faces the tapered surface 26. The space between the bearing surface of the first bearing 20 and the outer surface of the rotation shaft 10 is in communication with a space between the tapered surface 26 and the bearing surface 25a of the tapered bearing 25. In this configuration, the lubricating liquid supplied to the space between the bearing surface of the first bearing 20 and the outer surface of the rotation shaft 10 through the lubricating liquid supply passage 30 is guided to the space between the tapered surface 26 and the bearing surface 25a of the tapered bearing 25. As a result, the lubricating liquid guided to the space between the tapered surface 26 and the bearing surface 25a of the tapered bearing 25 produces a static pressure, and thus the tapered bearing 25 supports the thrust load of the rotation shaft 10.

In the turbo machine 1e, since the rotation shaft 10 includes the tapered surface 26, the end 11 of the rotation shaft 10, which is in the second space 41, has a small width. This reduces the loss caused when the lubricating liquid stored in the second space 41 is stirred by the rotation of the rotation shaft 10. As a result, the turbo machine 1e exhibits high performance in addition to high reliability.

Refrigerating Cycle Apparatus

Figure 6:
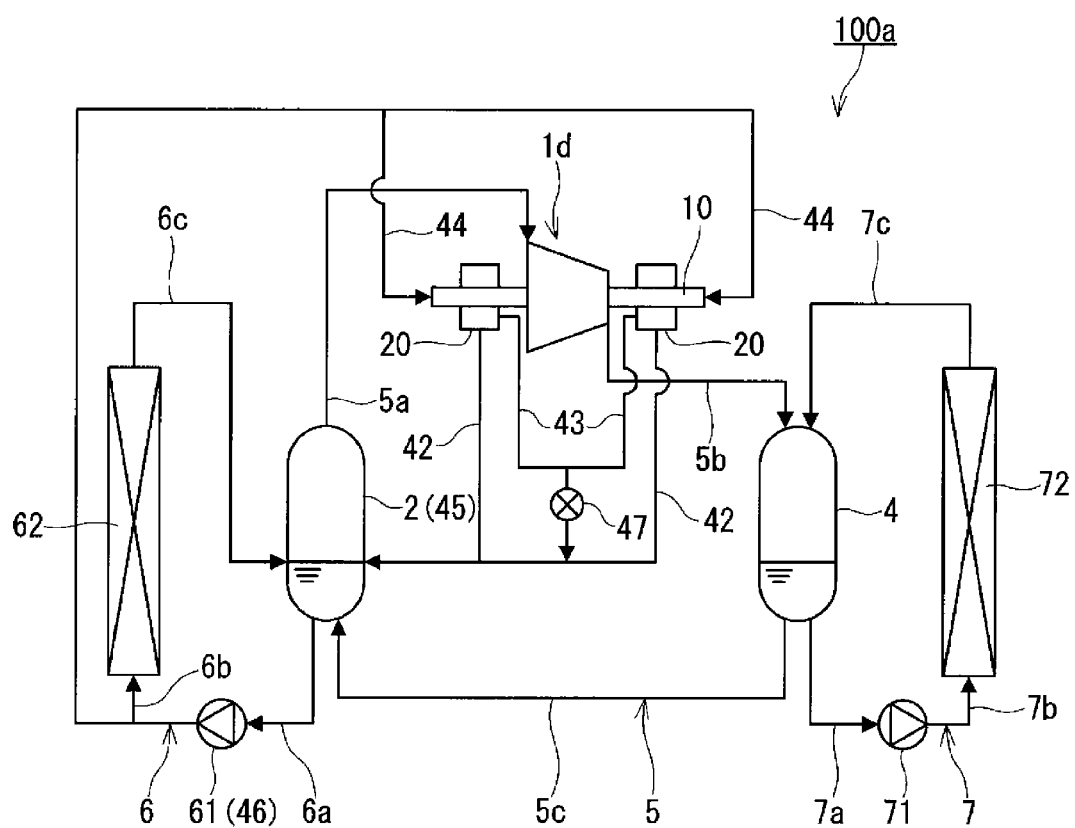
FIG. 6 is a block diagram illustrating an example of a refrigerating cycle apparatus of the present disclosure.

Next, an example of a refrigerating cycle apparatus of the present disclosure is described. As illustrated in FIG. 6, a refrigerating cycle apparatus 100a includes the turbo machine 1d, a condenser 4, and a communication passage 5c, and the storage tank 45 of the turbo machine 1d serves as an evaporator 2 of the refrigerating cycle apparatus 100a. The condenser 4 condenses the working fluid compressed by the turbo machine 1d and stores the working fluid as a refrigerant liquid. The condenser 4 is formed of a container having insulating properties and a pressure resistance, for example. The communication passage 5c allows an inner space of the condenser 4 and the inner space of the storage tank 45 to be in communication with each other. The communication passage 5c allows the refrigerant liquid to flow from the condenser 4 to the storage tank 45. The evaporator 2 stores the refrigerant liquid as the lubricating liquid and evaporates the refrigerant liquid so as to be supplied to the suction space 14. The evaporator 2 is formed of a container having insulating properties and a pressure resistance, for example. The refrigerating cycle apparatus 100a may include the turbo machine 1a, the turbo machine 1b, the turbo machine 1c, or the turbo machine 1e, instead of the turbo machine 1d.

The refrigerating cycle apparatus 100a includes a main circuit 5, an evaporation-side circulation circuit 6, and a condensation-side circulation circuit 7. The main circuit 5 is a circuit in which the evaporator 2, the turbo machine 1d, and the condenser 4 are connected in this order. The inner space of the evaporator 2 and the suction space 14 of the turbo machine 1d are in communication with each other through a passage 5a. The inner space of the casing 50 through which the working fluid discharged by the impeller 12 of the turbo machine 1d flows and the inner space of the condenser 4 are in communication with each other through a passage 5b. The main circuit 5 is filled with a refrigerant including water, alcohol, or ether as a main component, for example, and the pressure of the refrigerant is maintained at a negative pressure that is lower than atmospheric pressure. The refrigerating cycle apparatus 100a constitutes an air conditioner operated only in a cooling mode, for example.

The evaporation-side circulation circuit 6 includes a heat-absorption-side liquid feeding pump 61 and a heat absorption heat exchanger 62. In addition, the evaporation-side circulation circuit 6 is configured such that the refrigerant liquid stored in the evaporator 2 is supplied to the heat absorption heat exchanger 62 by using the heat-absorption-side liquid feeding pump 61 and such that the refrigerant that has absorbed heat at the heat absorption heat exchanger 62 returns to the evaporator 2. In the evaporation-side circulation circuit 6, the evaporator 2 and an inlet of the heat-absorption-side liquid feeding pump 61 are connected to each other through a passage 6a. An outlet of the heat-absorption-side liquid feeding pump 61 and the inlet of the heat absorption heat exchanger 62 are connected to each other through a passage 6b. In addition, the outlet of the heat absorption heat exchanger 62 and the evaporator 2 are connected to each other through a passage 6c. The refrigerant liquid in the evaporator 2 which has increased in the temperature due to the evaporation of the refrigerant in the evaporator 2 is pumped to the heat absorption heat exchanger 62 by the heat-absorption-side liquid feeding pump 61. The refrigerant liquid is heated at the heat absorption heat exchanger 62 and then returns to the evaporator 2. A pressure reducing mechanism may be disposed on the passage 6c so as to reduce the pressure of the refrigerant that has absorbed heat at the heat absorption heat exchanger 62. The heat absorption heat exchanger 62 cools the air in the room when the refrigerant in the heat absorption heat exchanger 62 absorbs heat.

The condensation-side circulation circuit 7 includes a heat-dissipation-side liquid feeding pump 71 and a heat dissipation heat exchanger 72. In addition, the condensation-side circulation circuit 7 is configured such that the refrigerant liquid stored in the condenser 4 is supplied to the heat dissipation heat exchanger 72 by using the heat-dissipation-side liquid feeding pump 71 and the refrigerant that has dissipated its heat at the heat dissipation heat exchanger 72 returns to the condenser 4. In the condensation-side circulation circuit 7, the condenser 4 and an inlet of the heat-dissipation-side liquid feeding pump 71 are connected to each other through a passage 7a. An outlet of the heat-dissipation-side liquid feeding pump 71 and an inlet of the heat dissipation heat exchanger 72 are connected to each other through a passage 7b. An outlet of the heat dissipation heat exchanger 72 and the condenser 4 are connected to each other through a passage 7c. The refrigerant cooled indirectly in the heat dissipation heat exchanger 72 is guided to the condenser 4 through the passage 7c. Thus, the refrigerant vapor compressed at the turbo machine 1 is cooled to be condensed. The refrigerant liquid, which has increased in the temperature due to the condensation, at the condensation mechanism 4 is pumped to the heat dissipation heat exchanger 72 by the heat-dissipation-side liquid feeding pump 71 and indirectly cooled by the heat dissipation heat exchanger 72, and then returns to the condenser 4. In the heat dissipation heat exchanger 72, the heat of the refrigerant is dissipated to the outdoor air.

The supply passage 44 of the turbo machine 1d partly constitutes the passage 6a and the passage 6b of the evaporation-side circulation circuit 6. In addition, the supply passage 44 of the turbo machine 1d branches from the evaporation-side circulation circuit 6 at a position downward of the outlet of the heat-absorption-side liquid feeding pump 61 in the evaporation-side circulation circuit 6. The supply passage 44 branches from the evaporation-side circulation circuit 6 at a position between the outlet of the heat-absorption-side liquid feeding pump 61 and the inlet of the heat absorption heat exchanger 62 in the evaporation-side circulation circuit 6, for example. In addition, the pump 46 of the turbo machine 1d serves as the heat-absorption-side liquid feeding pump 61. With this configuration, some of the refrigerant liquid stored in the evaporator 2 is pumped as the lubricating liquid to the second space 41 by the heat-absorption-side liquid feeding pump 61. In this case, the discharge pressure of the heat-absorption-side liquid feeding pump 61 is preferably set such that the pressure of the lubricating liquid at the inlet 33 of the lubricating liquid supply passage 30 is higher than the saturated vapor pressure.

Since the supply passage 44 branches from the evaporation-side circulation circuit 6 at the position between the outlet of the heat-absorption-side liquid feeding pump 61 and the inlet of the heat absorption heat exchanger 62 of the evaporation-side circulation circuit 6, the refrigerant liquid having a relatively low temperature is supplied as the lubricating liquid to the second space 41. Thus, the rotation shaft 10 and the first bearing 20 are cooled effectively.

The supply passage 44 may branch from the evaporation-side circulation circuit 6 at a position between the outlet of the heat absorption heat exchanger 62 and the evaporator 2 in the evaporation-side circulation circuit 6. In this case, some of the refrigerant in the refrigerating cycle apparatus 100a is also supplied as the lubricating liquid to the lubricating liquid supply passage 30. In this case, the supply passage 44 of the turbo machine 1d partly constitutes the passage 6a, the passage 6b, and the passage 6c, and constitutes the passage of the refrigerant in the heat absorption heat exchanger 62.

In the supply passage 44, any other pump than the heat-absorption-side liquid feeding pump 61 may be disposed at a position downstream of the branching position in the evaporation-side circulation circuit 6 in the direction of the flow of the lubricating liquid. In this case, the pressure of the refrigerant liquid supplied as the lubricating liquid to the second space 41 is further increases. As a result, evaporation and cavitation in the lubricating liquid in the lubricating liquid supply passage 30 and in the lubricating liquid near the lubricating liquid supply passage 30 are prevented, leading to an increase in the pressure of the lubricating liquid supplied to the first bearing 20.

As illustrated in FIG. 6, the first outlet passage 42 and the second outlet passage 43 in the turbo machine 1d, for example, share a specific passage connected to the evaporator 2. The lubricating liquid stored in the first space 40 returns to the evaporator 2 through the first outlet passage 42, and the lubricating liquid stored in the second space 41 returns to the evaporator 2 through the second outlet passage 43. Thus, the refrigerant liquid stored in the evaporator 2 is used as the lubricating liquid supplied to the first bearing 20, and the evaporator 2 is used as the storage tank 45 of the turbo machine 1d.

The refrigerating cycle apparatus 100a may constitute an air conditioner operated in cooling and heating modes in a switchable manner, for example. In such a case, an interior heat exchanger, which is disposed in a room, and an exterior heat exchanger, which is disposed outside a room, are connected to the evaporator 2 and the condenser 4 through a four-way valve. In the cooling mode, the interior heat exchanger function as the heat absorption heat exchanger 62 and the exterior heat exchanger functions as the heat dissipation heat exchanger 72. In the heating mode, the interior heat exchanger functions as the heat dissipation heat exchanger 72 and the interior heat exchanger functions as the heat absorption heat exchanger 62. The refrigerating cycle apparatus 100a may constitute a chiller, for example. The heat absorption heat exchanger 62 may cool gas other than the air or liquid with the refrigerant that absorbs heat, for example. In addition, the heat dissipation heat exchanger 72 may heat gas other than the air or liquid with the refrigerant that dissipates its heat, for example. Heat exchangers of any indirect type may be used as the heat absorption heat exchanger 62 and the heat dissipation heat exchanger 72.

The refrigerating cycle apparatus 100a may be modified from various perspectives. The turbo machine 1d may include a passage allowing communication between the first space 40 and the inner space of the condenser 4 and a passage allowing communication between the second space 41 and the inner space of the condenser 4, instead of the first outlet passage 42 and the second outlet passage 43, for example. In this case, the lubricating liquid stored in the first space 40 is supplied to the condenser 4, and the lubricating liquid stored in the second space 41 is supplied to the condenser 4.

Furthermore, in the refrigerating cycle apparatus 100a, the turbo machine 1d may have a multi-stage compression mechanism. In such a case, an intercooler may be disposed between the compression mechanisms. If the turbo machine 1d has a double-stage compression mechanism, for example, the temperature of the refrigerant vapor discharged from the compression mechanism on a first stage is 110° C., for example. The temperature of the refrigerant vapor discharged from the compression mechanism on a second stage is 170° C., for example. When the intercooler is disposed between the compression mechanism on the first stage and the compression mechanism on the second stage, the refrigerant vapor discharged from the compression mechanism on the first stage is cooled by the intercooler. In such a case, the temperature of the refrigerant vapor discharged to the compression mechanism on the second stage is 45° C., for example.

Furthermore, in the refrigerant cycle apparatus 100a, a different compressor than the turbo machine 1d may be connected in series with the turbo machine 1d. The different compressor may be a positive displacement compressor or a turbo machine. In this configuration, an intercooler may be disposed between the turbo machine 1d and the different compressor.

Furthermore, in the refrigerant cycle apparatus 100a, an expander such as a capillary tube or an expansion valve may be disposed on the communication passage 5c.

Figure 7:
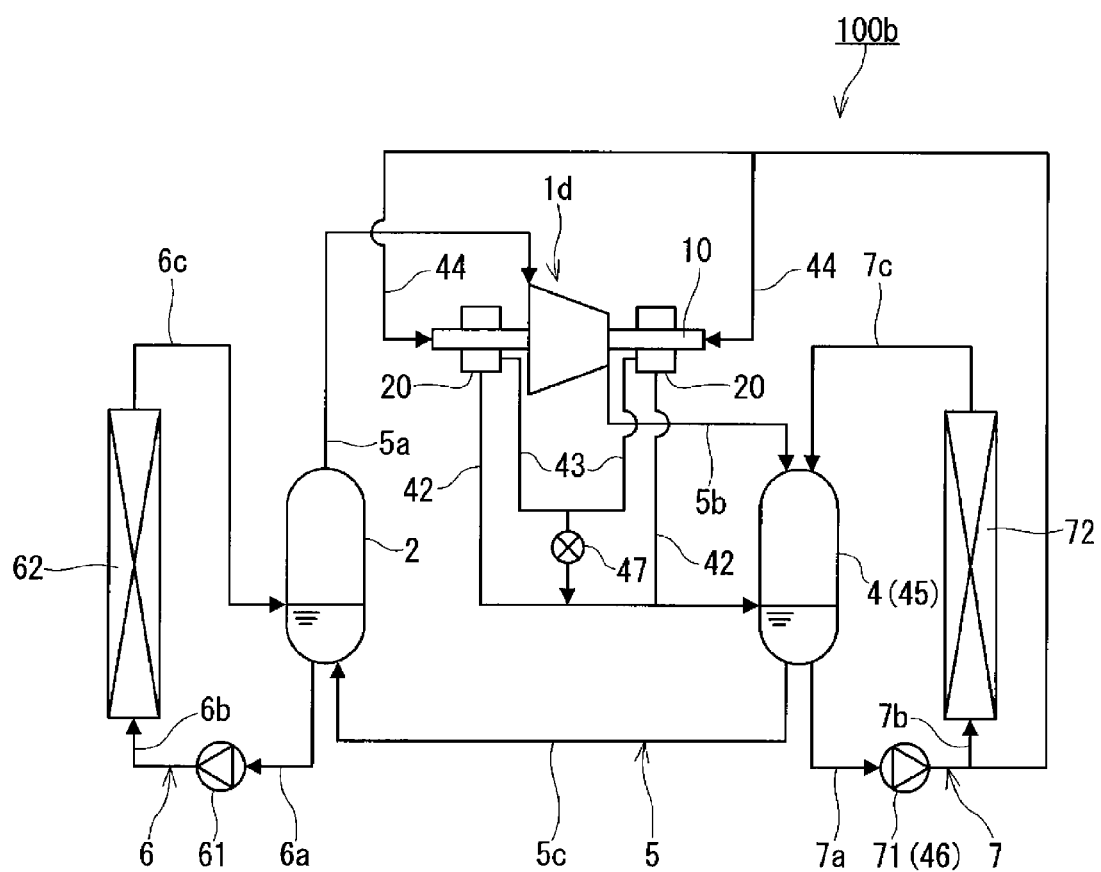
FIG. 7 is a block diagram illustrating another example of a refrigerating cycle apparatus of the present disclosure.
Figure 8:
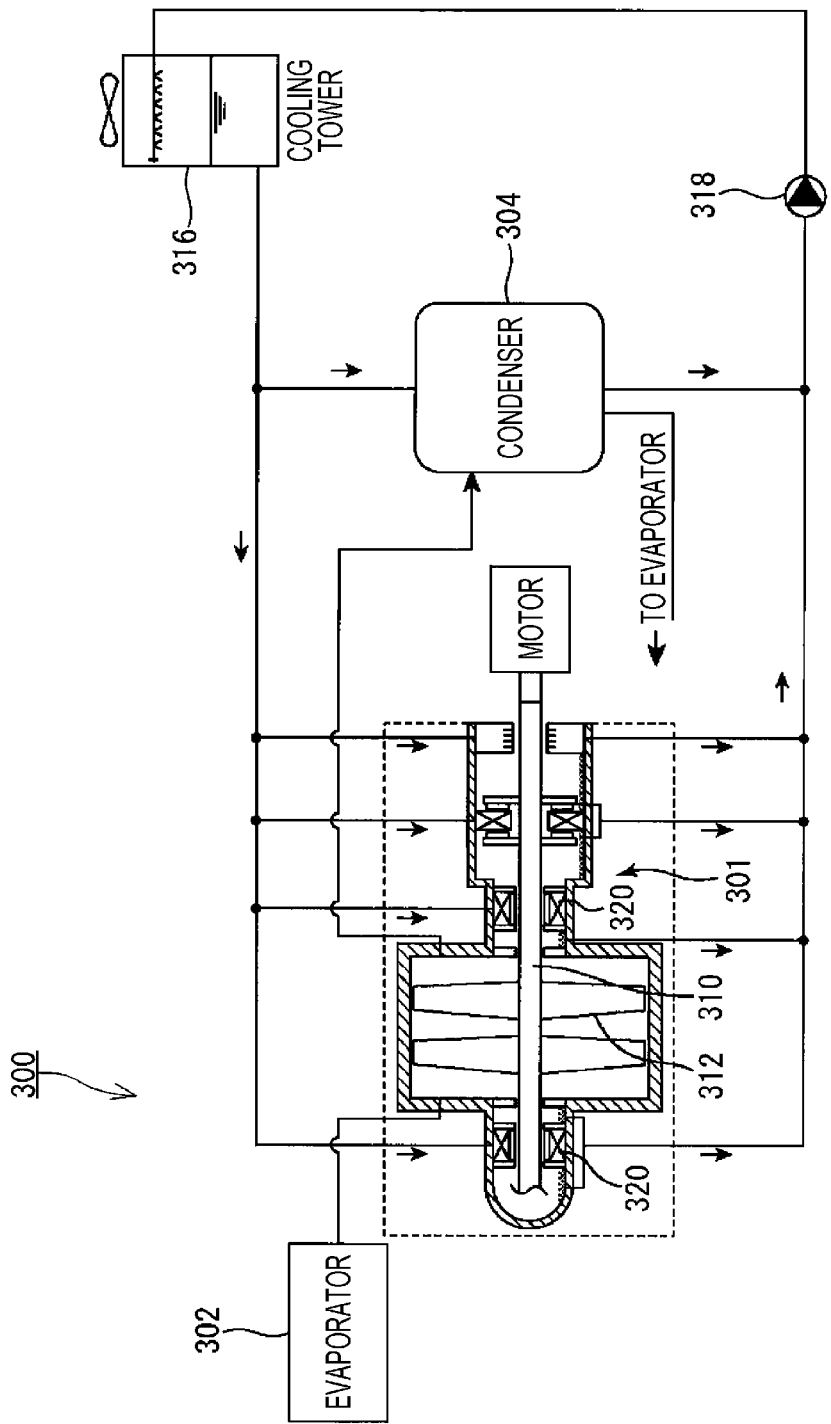
FIG. 8 is a block diagram illustrating a conventional refrigerating machine including a turbo machine as a compressor.
Figure 9:
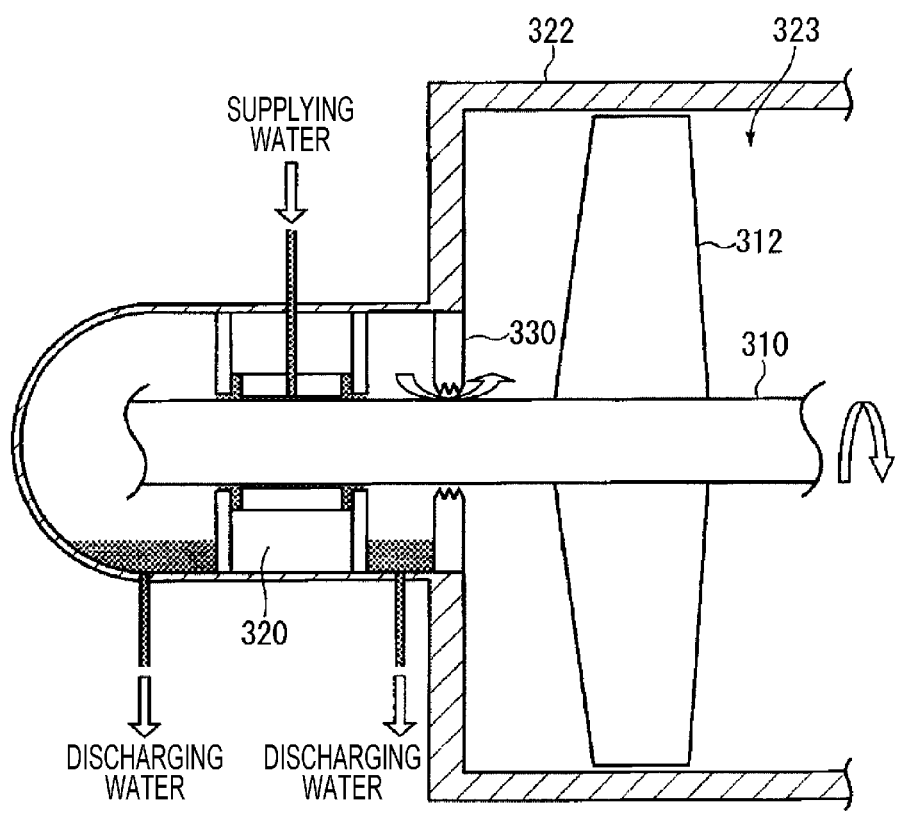
FIG. 9 is a magnified view schematically illustrating a portion of the compressor illustrated in FIG. 8.

In addition, the refrigerant cycle apparatus 100a may be modified to a refrigerant cycle apparatus 100b illustrated in FIG. 7, for example. The refrigerant cycle apparatus 100b has the same configuration as the refrigerant cycle apparatus 100a unless otherwise specified. The explanation regarding the refrigerant cycle apparatus 100a is applicable to the refrigerant cycle apparatus 100b if no technical contradiction occurs.

In the refrigerating cycle apparatus 100b, the storage tank 45 of the turbo machine 1d also serves as the condenser 4. Furthermore, in the refrigerating cycle apparatus 100b, the supply passage 44 of the turbo machine 1d partly constitutes the passage 7a and the passage 7b of the condensation-side circulation circuit 7. In addition, the supply passage 44 of the turbo machine 1d branches from the heat-dissipation-side circulation circuit 7 at a position downstream of the outlet of the heat-dissipation-side liquid feeding pump 71 in the condensation-side circulation circuit 7. The supply passage 44 branches from the condensation-side circulation circuit 7 at a position between the outlet of the heat-dissipation-side liquid feeding pump 71 and the inlet of the heat-dissipation heat exchanger 72 in the condensation-side circulation circuit 7. Furthermore, the pump 46 of the turbo machine 1d functions as the heat-dissipation-side liquid feeding pump 71. With this configuration, some of the refrigerant liquid stored in the condenser 4 is pumped as the lubricating liquid to the second space 41 by the heat-dissipation-side liquid feeding pump 71. In this case, the discharge pressure of the heat-dissipation-side liquid sending pump 71 is preferably set such that the pressure of the lubricating liquid at the outlet 33 of the lubricating liquid supply passage 30 is larger than the saturated vapor pressure.

Since the supply passage 44 branches from the condensation-side circulation circuit 7 at the position between the outlet of the heat-dissipation-side liquid feeding pump 71 in the condensation-side circulation circuit 7 and the inlet of the heat-dissipation heat exchanger 72, the refrigerant liquid having a relatively low temperature is supplied as the lubricating liquid to the second space 41. Thus, the rotation shaft 10 and the first bearing 20 are cooled effectively.

The supply passage 44 may branch from the condensation-side circulation circuit 7 at a position between the outlet of the heat-dissipation heat exchanger 72 in the condensation-side circulation circuit 7 and the condenser 4. In this case, some of the refrigerant in the refrigerating cycle apparatus 100b is also supplied as the lubricating liquid to the lubricating liquid supply passage 30. In this case, the supply passage 44 of the turbo machine 1d partly constitutes the passage 7a, the passage 7b, and the passage 7c, and also constitutes a passage for the refrigerant in the heat-dissipation heat exchanger 72.

As illustrated in FIG. 7, in the turbo machine 1d, for example, the first outlet passage 42 and the second outlet passage 43 share a specific passage connected to the condenser 4. The lubricating liquid stored in the first space 40 returns to the condenser 4 through the first outlet passage 42, and the lubricating liquid stored in the second space 41 returns to the condenser 4 through the second outlet passage 43. With this configuration, the refrigerant liquid stored in the condenser 4 is used as the lubricating liquid supplied to the first bearing 20, and the condenser 4 is used as the storage tank 45 of the turbo machine 1d.

In the refrigerating cycle apparatus 100b, the turbo machine 1d may be modified to a turbo machine including a passage that allows communication between the first space 40 and the inner space of the evaporator 2 and a passage that allows communication between the second space 41 and the inner space of the evaporator 2, instead of the first outlet passage 42 and the second outlet passage 43. In such a case, the lubricating liquid stored in the first space 40 is supplied to the evaporator 2, and the lubricating liquid stored in the second space 41 is supplied to the evaporator 2.

The refrigerating cycle apparatus including the turbo machine according to the present disclosure is particularly advantageous in home air-conditioners or industrial air-conditioners. In addition, the refrigerating cycle apparatus including the turbo machine according to the present disclosure is applicable to chillers or hot-water supply heat pumps.

REFERENCE SIGNS LIST 1a, 1b, 1c, 1d, 1e: turbo machine
2: evaporator
4: condenser
5c: communication passage
10: rotation shaft
11: end of rotation shaft
12: impeller
14: suction space
20: first bearing
21: second bearing
26: tapered surface
25: tapered bearing
25a: bearing surface of tapered bearing
31: main passage 32: sub-passage
36: groove
40: first space
41: second space
42: first outlet passage
43: second outlet passage
44: supply passage
45: storage tank
46: pump
47: pressure reducing device
49: gas-liquid separator
50: casing

What is claimed is:

1. A refrigerating cycle apparatus comprising:
a turbo machine; and
a condenser, wherein
the turbo machine includes:
a rotation shaft;
a first bearing that supports the rotation shaft at least in a radial direction of the rotation shaft;
a casing that forms a suction space into which a working fluid flows;
an impeller that is fixed to the rotation shaft in the casing and that compresses the working fluid flowed into the suction space to discharge the working fluid outside the casing by rotation of the rotation shaft;
a first space that is formed around the rotation shaft at a position between the impeller and the first bearing in an axial direction of the rotation shaft, that is in communication with a space formed between a bearing surface of the first bearing and an outer surface of the rotation shaft, and that stores a lubricating liquid;
a second space that is formed on an opposite side of the first bearing from the impeller in the axial direction of the rotation shaft, that is in communication with the space formed between the bearing surface of the first bearing and the outer surface of the rotation shaft, and that stores the lubricating liquid;
a storage tank that stores the lubricating liquid;
a first output passage that allows communication between an inner space of the storage tank and the first space and through which the lubricating liquid flows from the first space to the storage tank;
a supply passage that allows communication between the inner space of the storage tank and the second space and through which the lubricating liquid flows from the storage tank to the second space;
a pump that pumps the lubricating liquid to the second space;
a main passage that is in communication with the second space, that extends in the rotation shaft in the axial direction of the rotation shaft from one end of the rotation shaft, and through which the lubricating liquid stored in the second space flows in the axial direction of the rotation shaft; and
a sub-passage that is formed in the rotation shaft, that allows communication between the space formed between the bearing surface of the first bearing and the outer surface of the rotation shaft and the main passage, and through which the lubricating liquid flows from the main passage to the space formed between the bearing surface of the first bearing and the outer surface of the rotation shaft,
the second space is configured so as to be in communication with the space formed between the bearing surface of the first bearing and the outer surface of the rotation shaft via a first path and a second path, the first path including the main passage and the sub-passage,
the condenser condenses the working fluid compressed by the turbo machine and stores the working fluid as a refrigerant liquid;
the storage tank stores the refrigerant liquid as the lubricating liquid,
the refrigerant liquid flows through the space formed between the bearing surface of the first bearing and the outer surface of the rotation shaft, and
the first bearing has a ring-shaped groove formed in the bearing surface of the first bearing at a position around an outlet of the sub-passage in the outer surface of the rotation shaft.

2. A refrigerating cycle apparatus comprising:
a turbo machine; and
a condenser, wherein
the turbo machine includes:
a rotation shaft;
a first bearing that supports the rotation shaft at least in a radial direction of the rotation shaft;
a casing that forms a suction space into which a working fluid flows;
an impeller that is fixed to the rotation shaft in the casing and that compresses the working fluid flowed into the suction space to discharge the working fluid outside the casing by rotation of the rotation shaft;
a first space that is formed around the rotation shaft at a position between the impeller and the first bearing in an axial direction of the rotation shaft, that is in communication with a space formed between a bearing surface of the first bearing and an outer surface of the rotation shaft, and that stores a lubricating liquid;
a second space that is formed on an opposite side of the first bearing from the impeller in the axial direction of the rotation shaft, that is in communication with the space formed between the bearing surface of the first bearing and the outer surface of the rotation shaft, and that stores the lubricating liquid;
a storage tank that stores the lubricating liquid;
a first outlet passage that allows communication between an inner space of the storage tank and the first space and through which the lubricating liquid flows from the first space to the storage tank;
a supply passage that allows communication between the inner space of the storage tank and the second space and through which the lubricating liquid flows from the storage tank to the second space;
a pump that pumps the lubricating liquid to the second space;
a main passage that is in communication with the second space, that extends in the rotation shaft in the axial direction of the rotation shaft from one end of the rotation shaft, and through which the lubricating liquid stored in the second space flows in the axial direction of the rotation shaft; and
a sub-passage that is formed in the rotation shaft, that allows communication between the space formed between the bearing surface of the first bearing and the outer surface of the rotation shaft and the main passage, and through which the lubricating liquid flows from the main passage to the space formed between the bearing surface of the first bearing and the outer surface of the rotation shaft,
the second space is configured so as to be in communication with the space formed between the bearing surface of the first bearing and the outer surface of the rotation shaft via a first path and a second path, the first path including the main passage and the sub-passage, the condenser condenses the working fluid compressed by the turbo machine and stores the working fluid as a refrigerant liquid, the storage tank stores the refrigerant liquid as the lubricating liquid, the refrigerant liquid flows through the space formed between the bearing surface of the first bearing and the outer surface of the rotation shaft, and the turbo machine further comprising:
- a second bearing that is disposed on an opposite side of the first space from the impeller in the axial direction of the rotation shaft at a position closer than the first space to an end of the rotation shaft, and that supports the rotation shaft in at least the axial direction of the rotation shaft,
- wherein the rotation shaft includes a tapered surface that has an outer diameter gradually decreasing toward the end of the rotation shaft, and
- the second bearing forms a tapered hole having an inner diameter that gradually decreases toward the end of the rotation shaft, and that is a tapered bearing having a bearing surface facing the tapered surface.

3. The refrigerating cycle apparatus according to claim 2, wherein the pump is disposed on the supply passage.

4. The refrigerating cycle apparatus according to claim 2, wherein the first and second paths are separate paths extending from the second space.

5. The refrigerating cycle apparatus according to claim 2, wherein the second path extends to the outer surface of the rotation shaft from the second space.

6. The refrigerating cycle apparatus according to claim 2, wherein the second path directly connects the second space to the space formed between the bearing surface of the first bearing and the outer surface of the rotation shaft.

7. The refrigerating cycle apparatus according to claim 2, further comprising a gas-liquid separator that is disposed on the first outlet passage and that separates gas contained in the lubricating liquid from the lubricating liquid.

8. The refrigerating cycle apparatus according to claim 2, further comprising:
- a communication passage that allows communication between an inner space of the condenser and the inner space of the storage tank and through which the refrigerant liquid flows from the condenser to the storage tank, wherein
- the storage tank stores the refrigerant liquid as the lubricating liquid and serves as an evaporator that evaporates the refrigerant liquid so as to be supplied to the suction space.

9. The refrigerating cycle apparatus according to claim 2, further comprising a second outlet passage that allows communication between the inner space of the storage tank and the second space, and through which the lubricating liquid flows from the second space to the storage tank.

10. The refrigerating cycle apparatus according to claim 9, further comprising:
- a pressure reducing device that is disposed on the second outlet passage, and that reduces a pressure of the lubricating liquid, wherein
- the working fluid is selected from a fluid including water, alcohol, or ether as a main component and
- the first space is in communication with the suction space.

* * * * *